Jan. 28, 1964
P. I. BRULHART
3,119,573
SPINNING TYPE FISHING REEL
Filed Feb. 7, 1961
2 Sheets-Sheet 1
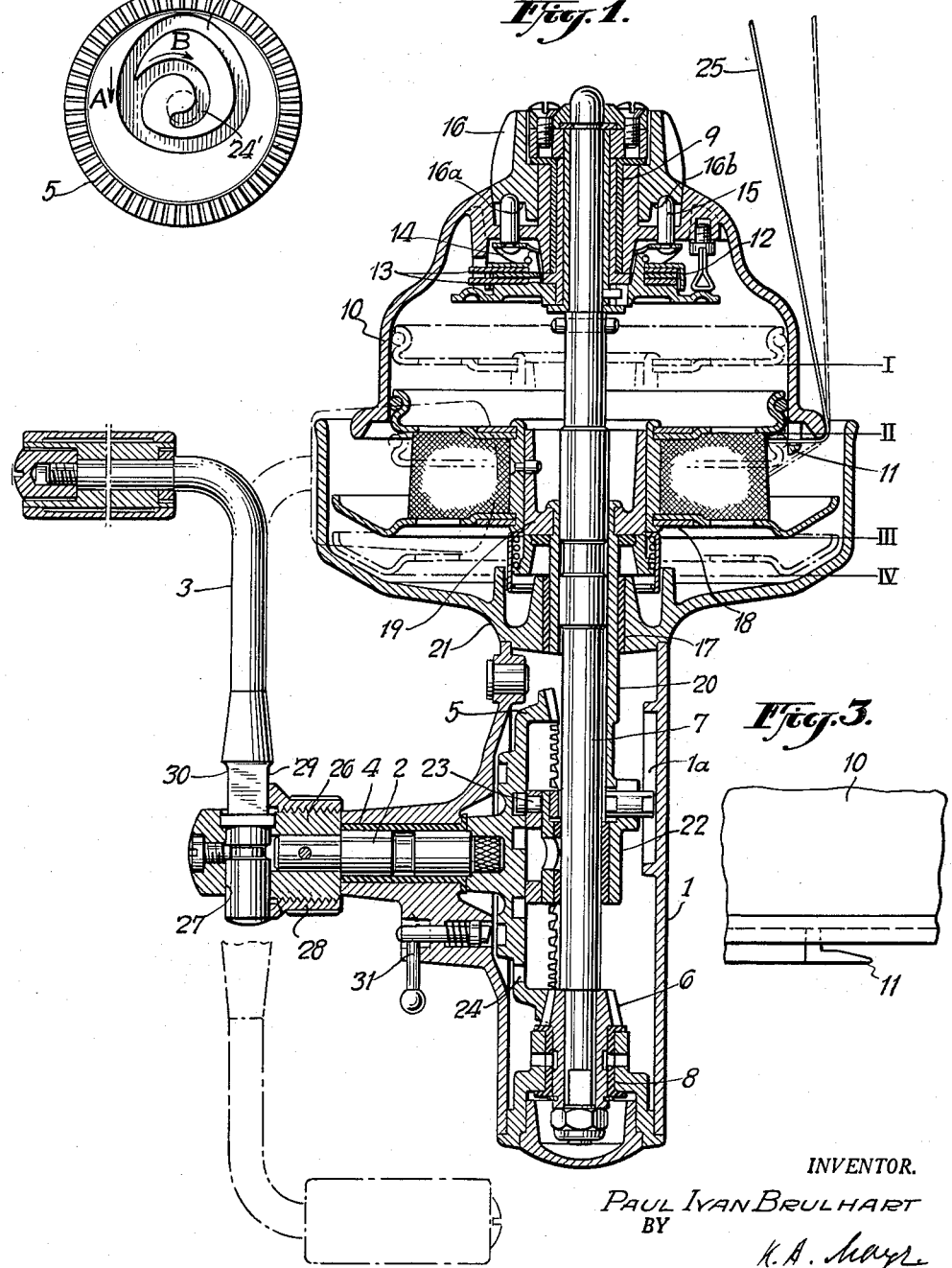
INVENTOR.
PAUL IVAN BRULHART
BY
ATTORNEY.

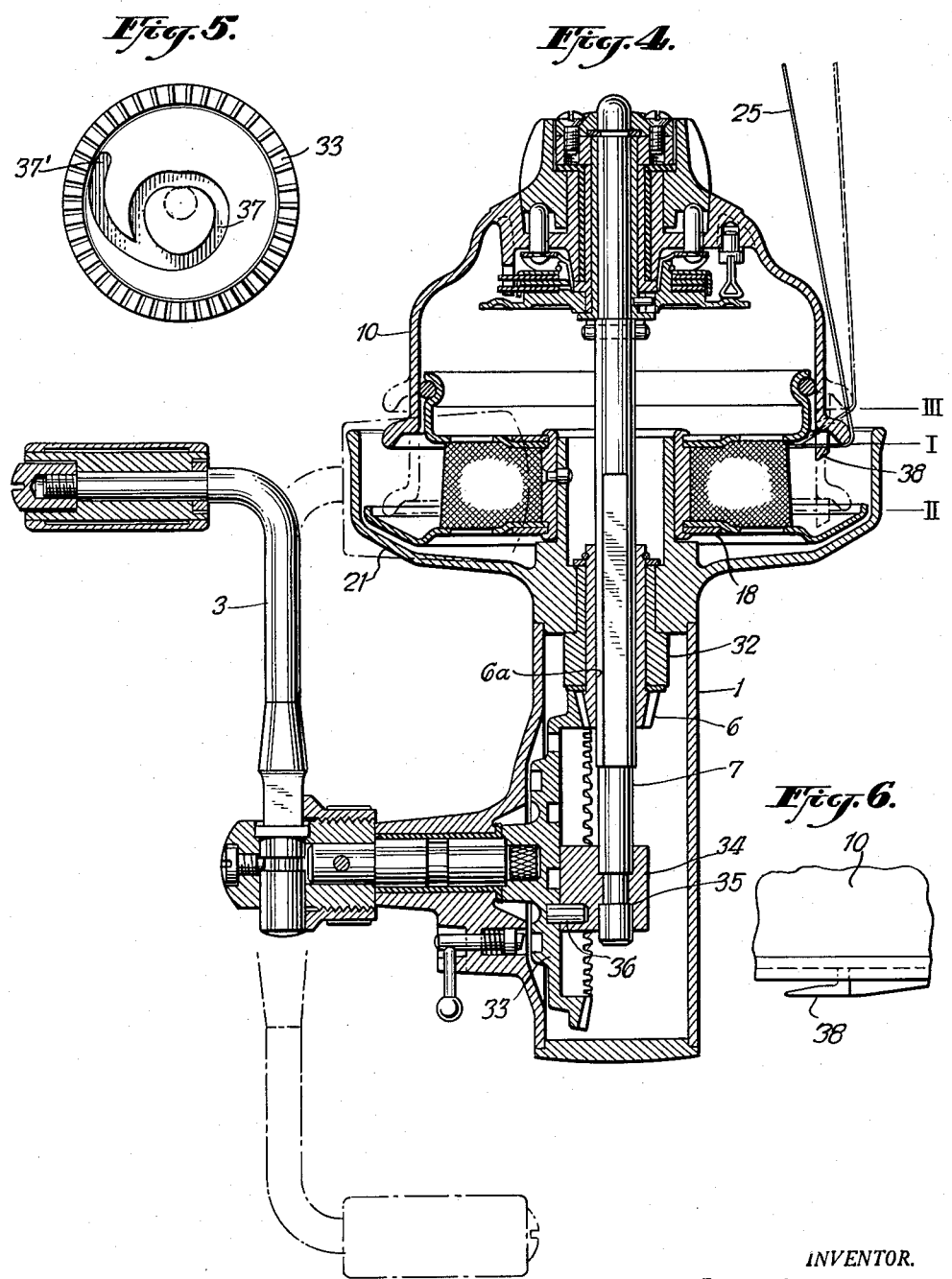

United States Patent Office 3,119,573
Patented Jan. 28, 1964

3,119,573
SPINNING TYPE FISHING REEL
Paul Ivan Brulhart, Baden, Switzerland
(64 Tosstalstrasse, Winterthur, Switzerland)
Filed Feb. 7, 1961, Ser. No. 87,588
Claims priority, application Switzerland Feb. 8, 1960
1 Claim. (Cl. 242—84.21)

This invention relates to fishing reels and more particularly to an improved spinning type fishing reel.

Prior art fishing reels of this type normally include a bell or cup-shaped winding element fixed on a driving spindle to be rotated thereby and means providing axial reciprocal motion to the winding element. Coaxial with and inside of the winding member is provided a line spool having a drag member and on this spool a line is wound. Depending upon the setting of the drag member the line spool can be rotated backward when line tension is sufficiently strong. Inside the bell-shaped winding element there is provided a laterally projecting retractable line pick up device which when projected serves to wind the line on the spool and when retracted allows casting of the line from the spool.

In casting line from this prior art type spinning reel the frictional force acting on the line varies in accordance with the reciprocal position of the winding member at the time of casting and is therefore not uniform.

Further due to the drag effect on the spool the line becomes twisted. Also due to the large frictional surface of the bell-shaped winding member wear on the line is considerable.

It is an object of my invention to provide an improved spinning type fishing reel.

A further object is to provide an improved spinning type fishing reel which is adapted to low cost manufacturing methods.

A still further object is to provide a spinning type reel utilizing a fixed pickup having no moving parts and in which frictional force on the line is reduced and made uniform.

Another object is to provide a spinning type reel in which wear on the line is reduced.

A further object is to provide a spinning reel which avoids the disadvantage of twisted line mentioned above.

A further object is to provide a spinning type reel in which both casting and winding operations are accomplished by operation of the one crank handle and no other mechanisms need be provided or operated.

The above and further objects and advantages of my invention will be apparent to those skilled in the art by reference to the following specification and accompanying drawings in which:

FIG. 1 is an elevated cross-sectional view of a spinning reel illustrative of a preferred embodiment of my invention;

FIG. 2 is a plan view of an eccentric cam system formed on the drive gear of the reel of FIG. 1;

FIG. 3 is a side view of a section of the winding member of the reel of FIG. 1 showing the fixed pickup device;

FIG. 4 is an elevated cross-sectional view of a spinning reel showing a modification of my invention;

FIG. 5 is a plan view of an eccentric cam system formed on the drive gear of the reel of FIG. 4; and FIG. 6 is a side view of a section of the winding member of the reel of FIG. 4 showing the fixed pickup device thereon.

Like parts are given like character references throughout the several figures.

Referring to the drawing, in FIG. 1 the numeral 1 indicates a gearbox, the shaft 2 of a crank 3 being mounted in a bush 4 on one of the side walls of this gearbox. Inside the gearbox a beveled driving gear 5 is fixed on the crankshaft 2, this gear being in engagement with a beveled pinion 6 which is fixed on the free end of the driving spindle 7 of the reel and mounted in a bearing 8 that is built into the gearbox casing. This bearing 8 also serves as a thrust bearing for the driving spindle.

On the other end of the driving spindle 7 there is a winding member in the form of a bell-shaped winding member 10 which is mounted on the spindle by means of a bearing bush 9. At the lower edge of the bell-shaped member 10 there is a pickup device 11 best viewed in FIG. 3 which device is rigidly fixed to the member 10 and can be provided with a roller, if necessary. The rotational motion of the spindle 7 is transmitted to the winding member by way of an adjustable friction clutch which also acts as a brake or drag member. This clutch consists of at least one disc 12 that is fixed on the driving spindle and, for instance, two discs 13 that are mounted on the spindle in a rotatable manner and are in contact with the disc 12 and are rotated by the bell-shaped element 10. An annular plate spring 14 serves to adjust the frictional force between the discs 12 and 13, the spring being pressed against the discs by means of pins 15. The pressure depends upon the position of pins 15 with respect to an annular cam surface including an inclined contact surface 16a inside a rotatable knob 16 located at the end of the bell-shaped member 10; the contact surface 16a is provided with notches or recesses 16b in which the pins can rest. The brake positions for different drag effects, corresponding to those notches, are indicated by numbers (not shown) on the end of the bell-shaped element just below the knob 16. In order to obtain the desired drag effect it is therefore only necessary to rotate the knob 16.

Between the winding member and the gearbox 1 there is a spool 18 which is mounted on a spool carrier 19, the tubular extension 20 of the carrier surrounding the driving spindle 7. The extension 20 is slidably supported in a bearing sleeve 17 fixed in a centrally apertured portion of a housing 21 facing the member 10 and fixed to the upper end of the gearbox 1, as seen in FIG. 1, in such a manner that the extension 20 can be displaced relatively to the driving spindle 7 in the axial direction, but cannot rotate due to a stop 1a formed in the housing 1. A block 22 of a scotch yoke is fixed to the extension 20 of the spool carrier 19 and slidably positioned on the driving spindle 7. The block 22 is provided with a pin 23 which coacts with an eccentric curved captive cam groove or path 24, 24' in the drive gear 5 and together with this cam groove forms an eccentric system. Path 24 comprises an endless eccentric cam groove defined by fixed surfaces and path 24' a dead end curved groove branching inwardly from the endless eccentric groove and defined by fixed surfaces as shown in FIG. 2 in a plan view. The block 22 and the pin 23 form a cam follower means. The method of operation of the reel is as follows:

In order to wind the line on spool 18, crank 3 is rotated in the forward direction whereby the driving spindle 7 is caused to rotate by means of the gears 5, 6. The rotation of the spindle 7 produces a rotation of the bell-shaped winding member 10 by means of the friction clutch 12, 13 which is adjusted for a definite drag, whereby the pickup device 11 which projects from the lower edge or annular rim portion of the bell-shaped member picks up the line 25 and carries it along so that it is wound onto the non-rotating spool 18. Simultaneously with the rotation of the driving spindle and the winding member 10 produced by crank 3, pin 23 executes a reciprocating movement resulting from following the endless eccentric cam groove or path 24 in the direction indicated by the arrow A in FIG. 2. This reciprocating motion is transmitted by the spool carrier 19, 20 to the spool 18 so that the line is coiled crosswise. The stroke of the spool 18 during winding is indicated by the limiting position I and II and is governed by the endless cam surface 24.

When casing or paying out the line, crank 3 is rotated in the reverse direction whereby spool 18 is displaced downwards by the eccentric system 22—24 from the normal winding position so that pickup device 11 can no longer engage the line 25 and the latter can unwind itself freely from the spool. This displacement of the spool 18 into the position IV, which, as seen in FIG. 1, lies below the lowest position III reached during winding, is effected by the curved cam paths or grooves 24, 24' on drive gear 5. These grooves are so constructed that when the crank is rotated in the reverse direction, guide pin 23 moves along another curved groove 24' in the direction indicated by arrow B and this results in a greater movement of the spool in the downward direction, whereby the pin when in the lowest position IV strikes against a stop at the end of the curved groove or path 24' so that no further rotation of the crank in the reverse direction is possible. During casting or paying out the line, the spool thus remains in the lowest position IV. It will be noted that the dead end guide surface forming the part 24' of the cam surface branches from the part 24 which forms an endless cam surface.

The reel described above has a sleeve 26 which is fixed on the crankshaft 2 and is provided with an external screw thread, the crank being mounted in an aperture 27 of this sleeve. The crank is kept fixed in the desired position by means of a lock ring 28 located on this sleeve and provided with a corresponding internal screw thread. The shaft of the crank 3 is provided with oppositely disposed flat surfaces 29—30 adjacent the lock ring 28. When ring 28 is unscrewed, crank 3 can be turned by 180° from the operating position, where the handle points outwards, into the non-operative position (dash-dotted lines, FIG. 1), whereupon the ring is tightened again. This latter position is very advantageous for transporting and packing the reel and prevents the crank from being damaged. Reference numeral 31 indicates a one-way ratchet clutch device which by means of the pressure of a spring only allows the crank to be actuated in the forward direction. When this clutch device is rotated 90°, its locking pin can be retracted against the force of the spring so that the crank can then also be rotated backwards.

In the modified form of my invention shown in FIGS. 4, 5 and 6, the line spool 18 is mounted in fixed position on the inverted bell housing 21 which is in turn fixed to the upper end of the gearbox 1, and the winding member 10 mounted on the driving spindle 7 performs the reciprocating movement required during the winding operation.

In this case the drive pinion 6 is rotatably mounted in a bearing sleeve 32 fixed in the inverted bell 21 and the driving spindle 7, which carries the winding member 10 on its outer end, is arranged longitudinally slidable but non-rotatable in a central longitudinally disposed aperture 6a of the drive pinion 6 as by a key and groove formation on the spindle and the pinion gear or other suitable means. Thus, the spindle 7 rotates with the pinion gear 6 and at the same time can also be displaced axially with respect to the drive pinion.

The pinion 6 is driven by the drive gear 33 which is actuated by the crank 3. The inner end of the driving spindle 7 below the pinion 6, as seen in FIG. 4, is rotatably mounted in a cam follower member 34, the spindle and the cam follower member having a portion of reduced cross-section forming shoulders 35 by which the cam follower can reciprocally move the spindle 7. The cam follower 34 has a guide pin 36 which follows a captive cam groove 37—37' (see FIG. 5) formed in the adjacent face of the drive gear 33.

The endless cam groove portion 37 is eccentric to provide a limited reciprocal motion to the drive spindle 7 and winding member 10 responsive to forward rotation of the crank 3 in winding line on the spool 18. Responsive to backward turning of the crank 3 the pin 36 follows cam grove 37' to dead end and displaces the winding member 10 a sufficient distance from the spool 18 that the pickup device, shown at 38 in FIG. 6, is beyond a point at which it can reach or interfere with the free outgo of line 25 during casting. Positions I and II indicate the limit of reciprocatory movement of the winding member 10 during winding of the line and position III indicates the casting position of the winding member.

The method of operation of this modified embodiment is as follows:

The curved path 37 (FIG. 5) provided inside the gear wheel is constructed in such a manner that when winding the line the bell-shaped winding member together with its pickup device performs a rotating movement as well as a reciprocating movement so that the line is wound crosswise on the spool. When casting or paying out the line, the crank is rotated in the reverse direction. This causes the bell-shaped winding member to be moved out of the normal winding range in the upward direction to such an extent that the pickup device on the winding member can no longer engage the line and the latter is thus free to unwind itself. For this purpose the eccentric curved path in the gear wheel is so shaped that upon a reverse rotation of the crank, the guide pin provided on the slide block follows the arm 37' of the curved path and this allows a greater movement of the winding member in the upward direction. As soon as the winding member has reached this desired uppermost position, it remains there until the driving spindle is again rotated in the opposite direction, that is in the winding direction.

While applicant has illustrated and described preferred embodiments of his invention, a reading of this disclosure will readily suggest to those skilled in the art various changes and modifications which can be made without departing from the spirit and scope of the invention. Applicant intends all such modifications and changes to be included in the scope of the attached claim as well as mechanical equivalents taken in view of the description. In particular the constructional forms of the eccentric system or curved cam path described above can be modified without departing from the spirit and scope of the invention.

I claim:

In a spinning type fishing reel provided with a reciprocatable spool element and a coaxial rotatable winding member adjacent thereto and drive means for said reciprocatable spool element and said rotatable winding member, rotatable in one direction for winding in a line on said spool, cam and follower means comprising an endless eccentric cam groove defined by fixed surfaces and a dead end curved groove branching inwardly from the endless eccentric groove and defined by fixed surfaces, said follower being displaceable from said endless groove to said dead end groove upon rotation thereof in the direction opposite to the line winding direction.

(References on following page)

References Cited in the file of this patent

UNITED STATES PATENTS

| | | |
|---|---|---|
| 2,627,383 | Tibbetts | Feb. 3, 1953 |
| 2,687,855 | Shakespeare et al. | Aug. 31, 1954 |
| 2,690,309 | Cuonz et al. | Sept. 28, 1954 |
| 2,705,113 | Bonanno | Mar. 29, 1955 |
| 2,711,292 | Taggart et al. | June 21, 1955 |
| 2,713,463 | Sarah | July 19, 1955 |
| 2,834,559 | Nagy | May 13, 1958 |
| 3,011,362 | Cronholm | Dec. 5, 1961 |
| 3,020,666 | Hull | Feb. 13, 1962 |
| 3,025,020 | Sarah | Mar. 13, 1962 |
| 3,033,486 | Wood | May 8, 1962 |

FOREIGN PATENTS

| | | |
|---|---|---|
| 411,216 | Italy | July 19, 1945 |

OTHER REFERENCES

Nurmse: German application 1,074,317, printed January 28, 1960 (45h 89/02).